United States Patent
Hartog et al.

(10) Patent No.: US 10,359,302 B2
(45) Date of Patent: Jul. 23, 2019

(54) NON-LINEAR INTERACTIONS WITH BACKSCATTERED LIGHT

(71) Applicant: Schlumberger Technology Corporation, Sugar Land, TX (US)

(72) Inventors: Arthur H. Hartog, Winchester (GB); Florian Englich, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/380,382

(22) Filed: Dec. 15, 2016

(65) Prior Publication Data

US 2017/0176221 A1    Jun. 22, 2017

Related U.S. Application Data

(60) Provisional application No. 62/269,476, filed on Dec. 18, 2015.

(51) Int. Cl.
*G01D 5/353* (2006.01)
*G01H 9/00* (2006.01)

(52) U.S. Cl.
CPC ..... *G01D 5/35361* (2013.01); *G01D 5/35364* (2013.01); *G01H 9/004* (2013.01)

(58) Field of Classification Search
CPC ....... G01D 5/35361; G01H 9/004; G01V 8/10
USPC .......................................................... 73/655
See application file for complete search history.

(56) References Cited

U.S. PATENT DOCUMENTS

| | | | |
|---|---|---|---|
| 5,194,847 A | 3/1993 | Taylor et al. | |
| 6,958,704 B2 | 10/2005 | Vinegar et al. | |
| 7,145,471 B2 | 12/2006 | Purkis et al. | |
| 7,546,319 B1 | 6/2009 | Srinivasan et al. | |
| 7,652,245 B2 | 1/2010 | Crickmore et al. | |
| 7,668,411 B2 | 2/2010 | Davies et al. | |
| 7,764,373 B2 | 7/2010 | Fujii et al. | |
| 7,872,736 B2 | 1/2011 | Rogers et al. | |
| 8,453,723 B2 | 6/2013 | Smithson | |
| 9,002,149 B2 | 4/2015 | Rogers | |
| 2004/0240769 A1 | 12/2004 | Spirin et al. | |
| 2008/0018903 A1* | 1/2008 | Bao ........................ | G01K 11/32 356/477 |

(Continued)

FOREIGN PATENT DOCUMENTS

| CN | 102589593 A | 7/2012 |
|---|---|---|
| CN | 203103754 U | 7/2013 |

(Continued)

OTHER PUBLICATIONS

Hartog et al., The Optics of Distributed Vibration Sensing, Second EAGE Workshop on Permanent Reservoir Monitoring, Jul. 2013, Stavanger, Norway.

(Continued)

*Primary Examiner* — Tarun Sinha

(57) ABSTRACT

Using hDVS techniques to detect a disturbance in a coherent Rayleigh backscatter caused by the presence of another optical signal in the fiber. The interaction can be caused by a pump pulse travelling shortly after a probe pulse and at a frequency close to that of the probe plus or minus a Brillouin frequency shift. This results in gain or attenuation of the backscatter signal. The Brillouin shift is a function of temperature and strain.

13 Claims, 8 Drawing Sheets

(56) References Cited

U.S. PATENT DOCUMENTS

| | | | |
|---|---|---|---|
| 2009/0008536 A1 | 1/2009 | Hartog et al. | |
| 2009/0304322 A1 | 12/2009 | Davies et al. | |
| 2010/0002226 A1 | 1/2010 | Hartog | |
| 2010/0014071 A1 | 1/2010 | Hartog | |
| 2010/0092176 A1 | 4/2010 | Hartog et al. | |
| 2010/0207019 A1 | 8/2010 | Hartog et al. | |
| 2011/0290992 A1* | 12/2011 | Sato | G01V 8/02 250/253 |
| 2011/0320147 A1* | 12/2011 | Brady | G01H 9/004 702/66 |
| 2013/0113629 A1 | 5/2013 | Hartog et al. | |
| 2013/0308682 A1* | 11/2013 | Tur | G01D 5/35303 374/161 |
| 2014/0327915 A1* | 11/2014 | Duncan | G01V 8/00 356/477 |
| 2015/0349486 A1* | 12/2015 | Ou | H01S 3/30 372/70 |

FOREIGN PATENT DOCUMENTS

| | | |
|---|---|---|
| EP | 0178814 A2 | 4/1986 |
| EP | 0385697 A1 | 9/1990 |
| EP | 1912050 A1 | 4/2008 |
| GB | 2126820 A | 3/1984 |
| GB | 2222247 A | 2/1990 |
| GB | 2442745 A | 4/2008 |
| GB | 2515574 A | 12/2014 |
| GB | 2469012 B | 2/2015 |
| WO | 9830881 A1 | 7/1998 |
| WO | 2006/048647 A2 | 5/2006 |
| WO | 2008012498 A1 | 1/2008 |
| WO | WO2009148824 A1 | 12/2009 |
| WO | 2010/020781 A1 | 2/2010 |
| WO | 2010/020795 A1 | 2/2010 |
| WO | 2010/020796 A1 | 2/2010 |
| WO | 2010/055293 A2 | 5/2010 |
| WO | 2010/090660 A2 | 8/2010 |
| WO | 2010/136764 A2 | 12/2010 |
| WO | 2010/136768 A2 | 12/2010 |
| WO | 2010/136773 A2 | 12/2010 |
| WO | 2010/136809 A2 | 12/2010 |
| WO | 2010/136810 A2 | 12/2010 |
| WO | 2011/039501 A2 | 4/2011 |
| WO | 2011/058312 A2 | 5/2011 |
| WO | 2011/058322 A2 | 5/2011 |
| WO | 2011/067554 A1 | 6/2011 |
| WO | 2012063066 A2 | 5/2012 |
| WO | 2012068558 A1 | 5/2012 |

OTHER PUBLICATIONS

Dakin, JP., A Distributed Fibre Temperature Sensor Using the Optical Kerr Effect, SPIE Proceedings II, Oct. 14, 1987. vol. 0798. 9 pages.
U.S. Appl. No. 15/167,587, filed May 27, 2016. 15 pages.
Combined Search and Examination Report for GB Application Serial No. 1621510.5, dated Jun. 15, 2017, 12 pages.
Shimizu, K., et al., "Frequency translation of light waves by propagation around an optical ring circuit containing a frequency shifter: 1. Experiment," Applied Optics, Nov. 20, 1993, pp. 6718-6726, 32(33), Optical Society of America.
Shimizu, K., et al., "Frequency translation of light waves by propagation around an optical ring circuit containing a frequency shifter: II. Theoretical analysis," Applied Optics, May 20, 1994, pp. 3209-3219, 33(15), Optical Society of America.
Shimizu, K., et al., "Coherent self-heterodyne detection of spontaneously Brillouin-scattered light waves in a single-mode fiber," Optics Letters, Feb. 1, 1993, pp. 185-187, 18(3), Optical Society of America.
Bennett, S., et al., 1.8-THz Bandwidth, Zero-Frequency Error, Tunable Optical Comb Generator for DWDM Applications. IEEE Photonics Technology Letters, 1999. 11(5): p. 551-3.
Silva, C.F.C., A.J. Seeds, and P.J. Williams, Terahertz span >60-channel exact frequency dense WDM source using comb generation and SG-DBR injection-locked laser filtering. Photonics Technology Letters, IEEE, 2001. 13(4): p. 370-372.
Mermelstein, M.D., et al., Rayleigh scattering optical frequency correlation in a single-mode optical fiber. Optics Letters, 2001. 26(2): p. 58-60.
Barnoski, et al., "Fiber waveguides: a novel technique for investigating attenuation characteristics," Applied Optics, Sep. 1976, pp. 2112-2115, 15(9).
M. Gold, Design of a long-range single-mode OTDR. Lightwave Technology, Journal of 3 (1985) 39-46.
Danielson, B.L., "Optical time-domain reflectometer specifications and performance testing," Applied Optics, Aug. 1, 1985, pp. 2313-2322, 24(15).
King, et al., "Development of a Coherent OTDR Instrument," Lightwave Technology, Apr. 1987, pp. 616-624, LT-5(4), IEEE.
Bodtker, et al., "Heterodyne OTDR at 0.82um," Electronics Letters, May 12, 1983, pp. 361-362, 19(10).
Healey, et al., "OTDR in Single-Mode Fibre at 1.5 um Using Heterodyne Detection," Electronics Letters, Sep. 30, 1982, pp. 862-863, 18(20).
Izumita, et al., "Fading Noise Reduction in Coherent OTDR," Photonics Technology Letters, Feb. 1992, pp. 201-203, 4(2), IEEE.
Juarez et al., "Polarization discrimination in a phase-sensitive optical time-domain reflectometer intrusion-sensor system," Optics Letters, Dec. 15, 2005, pp. 3284-3286, 30(24), Optical Society of America.
Juarez, et al., "Field test of a distributed fiber-optic intrusion sensor system for long perimeters," Applied Optics, Apr. 10, 2007, pp. 1968-1971, 46(11), Optical Society of America.
Juskaitis, et al., "Distributed interferometric fiber sensor system," Optics Letters, Nov. 15, 1992, pp. 1623-1625, 17(22), Optical Society of America.
Juskaitis, et al., "Interferometry with Rayleigh backscattering in a single-mode optical fiber," Optics Letters, Feb. 1, 1994, pp. 225-227, 19(3), Optical Society of America.
Shatalin, et al., "Interferometric optical time-domain reflectometry for distributed optical-fiber sensing," Applied Optics, Aug. 20, 1998, pp. 5600-5604, 37(24), Optical Society of America.
Posey, et al., "Strain sensing based on coherent Rayleigh scattering in an optical fibre," Electronics Letters, Sep. 28, 2000, pp. 1688-1689, 36(20), IEEE.
Posey, et al., "Rayleigh Scattering Based Distributed Sensing System for Structural Monitoring," 14th Conference on Optical Fibre Sensors, Venice, Italy, 2001, pp. 678-681, FR 2-6, Naval Research Laboratory, Optical Sciences Division, Washington, D.C, USA.
Hartog, et al., "On the Theory of Backscattering in Single-Mode Optical Fibers," Journal of Lightwave Technology, Apr. 1984, pp. 76-81, LT-2(2), IEEE.
Nakagawa, et al., "Frequency noise reduction of a diode laser by using the FM sideband technique," Optics Letters, Jul. 1, 1992, pp. 934-936, 17(13), Optical Society of America.
Sheem, "Optical fiber interferometers with [3×3] directional couplers: Analysis," Journal of Applied Physics Jun. 1981, pp. 3865-3872, 52(6).
Mertz, "Complex interferometry," Applied Optics, May 15, 1983, pp. 1530-1534, 22(10), Optical Society of America.
Pietzsch, "Scattering Matrix Analysis of 3×3 Fiber Couplers," Journal of Lightwave Technology, Feb. 1989, pp. 303-307, 7(2), IEEE.
Xie, et al., "Side-hole fiber for fiber-optic pressure sensing," Optics Letters, May 1986, pp. 333-335, 11(5), Optical Society of America.
Varnham, et al., "Analytic Solution for the Birefringence Produced by Thermal Stress in Polarization-Maintaining Optical Fibers," Journal of Lightwave Technology, Jun. 1983, pp. 332-339, LT-1(2), IEEE.
Molenaar, M., et al., "First Downhole Application of Distributed Acoustic Sensing (DAS) for Hydraulic Fracturing Monitoring and Diagnostics," in SPE Hydraulic Fracturing Technology Conference and Exhibition, Jan. 24-26, 2011, The Woodlands, TX, USA, 9 pages, Society of Petroleum Engineers.

(56) References Cited

OTHER PUBLICATIONS

Mestayer, J., et al., "Field Trials of Distributed Acoustic Sensing for Geophsyical Monitoring," SEG 2011 annual meeting San Antonio, TX Sep. 2011, pp. 4253-4257, SEG.
International Search Report and Written Opinion of PCT Application No. PCT/US2011/049720, dated Apr. 10, 2012, 10 pages.
European Search Report of European Application No. 11822482.3, dated Oct. 7, 2016, 7 pages.

* cited by examiner

NON-LINEAR INTERACTIONS WITH BACKSCATTERED LIGHT

CROSS-REFERENCE TO RELATED APPLICATIONS

This application claims the benefit of U.S. Provisional Patent Application No. 62/269,476 entitled NON-LINEAR INTERACTIONS WITH BACKSCATTERED LIGHT filed Dec. 18, 2015 which is incorporated by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Information from the wells can prove valuable, but reliably obtaining useful information from the well is difficult.

Distributed vibration sensing (DVS, also known as distributed acoustic sensing DAS) is used increasingly to measure seismic signals in wells and also to detect noise relating to flow events, as examples. These techniques are based on optical time domain reflectometry in which one or more pulse(s) of probe light are (is) launched into the fibre. The signal consists of light that is scattered by fixed inhomogeneities in the glass and then re-captured by the waveguide in the return direction. With a coherent source illumination, the scattering from all the scatterers is re-emitted with a fixed phase, resulting in a speckle-like signal that is highly sensitive to the source frequency and the precise disposition of the scatterers. If the fibre is undisturbed and the source frequency is stable, then so too is the amplitude and the phase of the scattered electric field. However, if the fibre is strained by a small fraction of an optical wavelength, then the backscatter signal is altered. The sensitivity of the measurement is of the order of nanometers or in some cases of order 1-200 pm.

In heterodyne DVS and some other techniques, the phase of the light scattered by two locations separated by a distance known as the gauge length (GL) is compared. This provides a more linear response to strain than measuring the backscatter intensity. A review of some of the different techniques for acquiring this type of data is given in a paper by A. H. Hartog, L. B. Liokumovich, and O. I. Kotov entitled "The Optics of Distributed Vibration Sensing," published in 2013.

SUMMARY

Embodiments of the present disclosure are directed to a system for measuring vibration in a structure. The system includes an optical fiber proximate to the structure having a first end and a second end. Vibration in the structure causes a backscatter through the optical fiber in response to light being emitted into the optical fiber. The system also includes a measurement component configured to measure the vibration in the system as related to the backscatter in the optical fiber, wherein the measurement component is positioned proximate the first end of the optical fiber. The system also includes a first laser source configured to emit a first laser into the optical fiber proximate the first end of the optical fiber, the first laser having a first frequency. The system also includes a second laser source configured to emit a second laser into the optical fiber proximate the first end of the optical fiber, the second laser having a second frequency. The difference between the first frequency and the second frequency is delta-f.

Further embodiments of the present disclosure are directed to a method of detecting vibration in a structure. The method includes positioning an optical fiber proximate to the structure such that displacement of the structure affects reflective properties of the optical fiber, and emitting a probe laser into the optical fiber at a first end of the optical fiber. The method also includes emitting a pump laser into the optical fiber at the first end. The pump laser and the probe laser have different frequencies separated by a delta-f frequency. The pump laser is configured to interact with the probe laser to improve a backscatter signal through the optical fiber.

DETAILED DESCRIPTION

Figure 1:
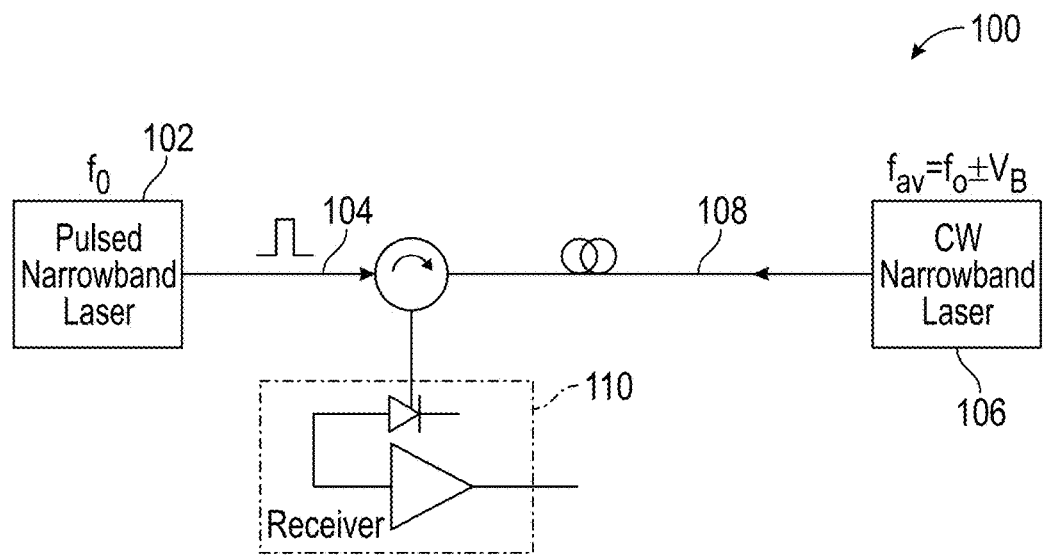
FIG. 1 illustrates a basic setup for Observation of Brillouin gain—BOTDA (Brillouin optical time-domain analysis) according to the prior art.

In the following description, numerous details are set forth to provide an understanding of the present disclosure. However, it will be understood by those skilled in the art that the embodiments of the present disclosure may be practiced without these details and that numerous variations or modifications from the described embodiments may be possible.

Embodiments of the present disclosure are directed to a number of techniques relating to how the signal measured by a coherent optical time-domain reflectometer (OTDR) trace and in particular a phase-measuring coherent-detection OTDR is affected by other light travelling in the same fibre.

Distributed vibration sensing (DVS, also known as distributed acoustic sensing DAS) is used increasingly to measure seismic signals in wells and also to detect noise relating to flow events, as examples. These techniques are based on optical time domain reflectometry in which one or more pulse(s) of probe light are (is) launched into the fibre. The signal consists of light that is scattered by fixed inhomogeneities in the glass and then re-captured by the waveguide in the return direction. With a coherent source illumination, the scattering from all the scatterers is re-emitted with a fixed phase, resulting in a speckle-like signal that is highly sensitive to the source frequency and the precise disposition of the scatterers. If the fibre is undisturbed and the source frequency is stable, then so too is the amplitude and the phase of the scattered electric field. However, if the fibre is strained by a small fraction of an optical wavelength, then the backscatter signal is altered. The sensitivity of the measurement is of the order of nanometers or in some cases of order 1-200 pm.

In heterodyne DVS and some other techniques, the phase of the light scattered by two locations separated by a distance known as the gauge length (GL) is compared. This provides a more linear response to strain than measuring the backscatter intensity. A review of some of the different techniques for acquiring this type of data is given in a paper by A. H. Hartog, L. B. Liokumovich, and O. I. Kotov entitled "The Optics of Distributed Vibration Sensing," published in 2013.

Embodiments of the present disclosure are directed to using hDVS or similar techniques to detect the disturbance to the coherent Rayleigh backscatter caused by the presence of another optical signal in the fibre. The interaction could be caused by a pump pulse travelling shortly after the probe pulse and at a frequency close to that of the probe plus or minus a Brillouin frequency shift. This results in gain or attenuation of the backscatter signal (gain if the pump is at a higher frequency, loss if it is at a lower frequency). The interaction occurs only if the frequencies are in the correct relationship and, because the Brillouin shift is a function of temperature and strain, the proposed technique provides a means of measuring the value of the Brillouin shift.

In some embodiments, the modulation of the Rayleigh backscatter could be caused by the Kerr effect, i.e. the fact that the refractive index is modified by the presence of a strong electric field in the medium.

FIG. 1 illustrates a basic setup 100 for Observation of Brillouin gain—BOTDA (Brillouin optical time-domain analysis). The interaction between an optical pulse and a counter-propagating continuous wave is the basis of one type of Brillouin distributed sensor. The BOTDA setup 100 includes a pulsed narrowband laser 102 configured to emit a first propagating beam 104, and a CW narrowband laser 106 configured to emit a second propagating beam 108, counter to the first propagating beam 104. The frequency difference between the first propagating beam 104 and the second propagating beam 108 is exactly equal to the Brillouin frequency shift, interaction occurs in the form of gain ($f_{cw}=f_0-v_B$) or loss ($f_{cw}=f_0+v_B$) to the cw beam 108 (that is the signal that is monitored). This interaction is local to where the pulse is in the fibre. The signals can be monitored by a receiver 110.

Another approach to measuring the Brillouin backscatter signal, known as BOTDR (Brillouin optical time domain reflectometry is a single-ended measurement that launches a probe pulse into the sensing fibre and separates, in the backscatter return that portion of the signal that is due to Brillouin (as opposed to Rayleigh) scattering. If this measurement is performed in a way that allows the frequency shift of the Brillouin light to be determined, then the same information that is provided by BOTDA (namely the frequency shift as a function of location along the fibre) is obtained, with the added bonus of a measure of the intensity of the Brillouin signal. In general the BOTDR signals are weaker and so less effective than BOTDA (because of the amplification inherent in the BOTDA process); however, BOTDR is frequently used because it does not require access to both ends of the sensing fibre.

Figure 2:
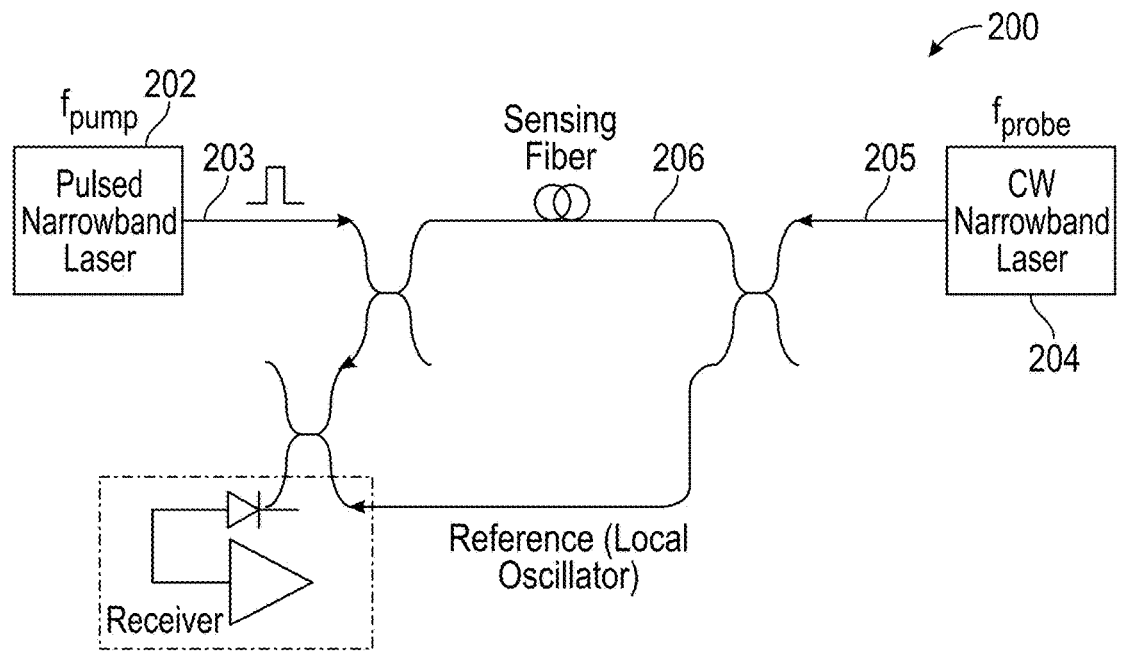
FIG. 2 illustrates another approach for Brillouin optical time domain reflectometry according to the prior art.

A few years before the work on BOTDA, Dakin published a paper entitled A Distributed Febre Temperature Sensor Using the Optical Kerr Effect. (Dakin) in which Dakin described using a similar arrangement to that of BOTDA but where the frequencies were not related by a Brillouin shift. FIG. 2 illustrates a BOTDA arrangement according to Dakin's paper. Dakin's approach is shown at 200. It includes a pulsed narrowband laser 202 emitting a first laser 203, a CW narrowband laser 204 emitting a counter propagating laser 205. Both lasers 202 and 204 emit light through a fiber 206.

The similarities between FIG. 1 and FIG. 2 are clear and a similar arrangement could be used for the Brillouin measurement. In the case FIG. 2 and Dakin, Dakin was interested in observing the phase change caused by the presence of the probe pulse through the Kerr effect. The Kerr effect is a different non-linear optical effect that is caused by the fact that light travelling in a dielectric medium modulates its refractive index. This is a minute effect but at sufficiently large intensities and with sufficiently sensitive measurement techniques, it can be measured. The intensity is helped in an optical fibre by the confinement of the light in the small area of the core and the sensitivity is achieved using coherent detection techniques (illustrated in FIG. 2 where the detector essentially compares the phase of the two beams, one affected by the counter-propagating probe pulse and the other, the reference is unaffected by it.

The presence of the counter propagating pulse was clearly visible in Dakin's paper and shown in FIG. 2 showed a change in phase of about 10 mrad due to the presence of the probe pulse. However, the intention of the authors was to use what they thought was a temperature dependent Kerr effect as a distributed temperature sensor and it turned out that they were misled by earlier, erroneous, papers, in that the Kerr effect seems to have only weak temperature dependence, if any.

Figure 3:
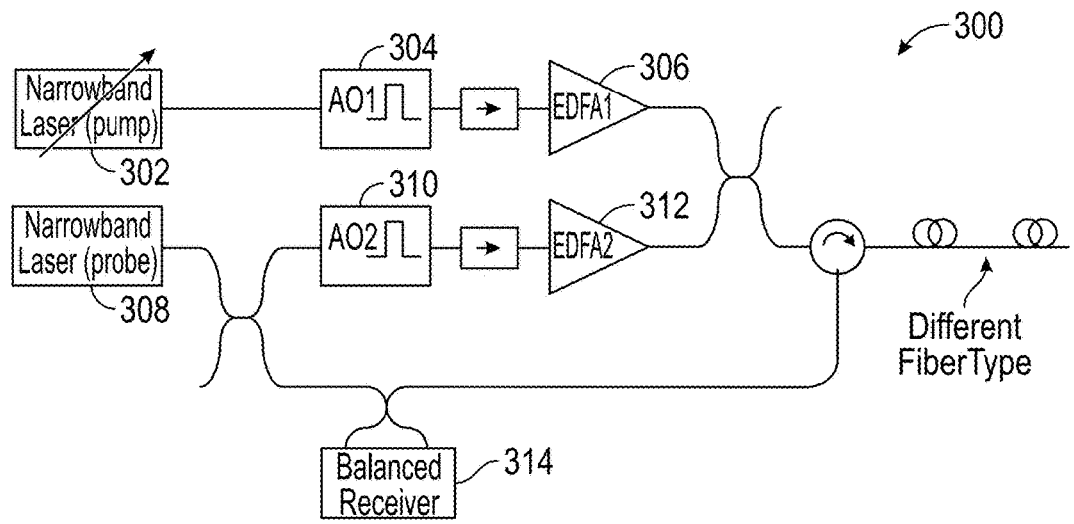
FIG. 3 illustrates a schematic for use with the present disclosure including using making an OTDR measurement with a coherent source and broadly simultaneously propagating additional optical signals (called pump signals), usually pulses, in the fibre and observing the effect on the OTDR signature according to embodiments of the present disclosure.

FIG. 3 illustrates a schematic for use with the present disclosure including using making an OTDR measurement with a coherent source and broadly simultaneously propagating additional optical signals (called pump signals), usually pulses, in the fibre and observing the effect on the OTDR signature. The arrangement 300 includes a first narrowband laser 302, a first acousto-optic modulator 304 (AO1), a first erbium doped fibre amplifier 306 (EDFA1). The arrangement 300 also includes a second narrowband laser 308, a second accousto-optic modulator 310 (AO2), and a second EDFA 312 (EDFA2). In one embodiment, the disclosure is directed to a means of remotely amplifying the backscatter trace close to where it is generated and so to increase the signal strength and therefore, one hopes, the signal-to-noise ratio. In particular, using Brillouin interactions between the probe pulse and the backscatter, the amplification can be selective to one part of another of the fibre. The reason for this is that in many situations, the Brillouin frequency shift is a function of position and so the frequency and the time of the pump pulses can be adjusted to match the Brillouin condition only in the desired locations. More generally, the gain that each section of fibre is subject to can be adjusted by a choice of the time/frequency profile of the pump signals.

In another embodiment, it can be used in a similar way to the counter-propagating CW/pulse techniques (such as BOTDA or the Kerr experiment already described), but using the backscatter from a previous probe pulse, rather than a separate counter-propagating beam. Of course, the backscatter signal will be weaker than if a reasonable continuous signal had been launched from the second end of the fibre. Embodiments of this disclosure provide that access is not required at the far end of the fibre, a critical factor in applications in the oilfield where such access (even if looped from the surface) is difficult and it cannot be retro-fitted. Moreover, in the event of a fibre break, the entire sensing fibre would be lost, in contrast to what is proposed here, i.e. the fibre would continue to be available for sensing up to the location of the break. In yet another embodiment, it might be possible to use effects other than stimulated Brillouin scattering.

The probe laser output from the second narrowband laser 308 can be split into one (path local oscillator) that is taken directly to a balanced receiver 314 and a second path that includes a modulator 310 (AO2) that cuts a pulse from the laser output and simultaneously shifts it in frequency by Δf. The pulse is amplified in an erbium doped fibre amplifier (EDFA) prior to being launched into the sensing fibre (shown as a multi-section of fibres of different types). The Rayleigh backscatter returning from the fibre as a result of the probe pulse is also directed to the balanced receiver where it mixes with the local oscillator light to provide a quasi-sinusoidal signal at the intermediate frequency Δf. This arrangement is used in SLB as a distributed seismic or vibration sensor.

Now consider the upper part of the drawing—a laser from the first narrowband laser 302 at a different frequency from that of the probe laser 308 launches a pump pulse (defined by modulator 304 (AO1) and amplified by EDFA 306) into the sensing fibre at the same time or very slightly later than the probe pulse. If the frequency of the pump laser is higher by the Brillouin shift than the probe laser, the pump pulse will interact with the Rayleigh backscatter generated by the probe pulse. This arrangement can be used as a means of amplifying the Rayleigh backscatter and therefore of improving the signal-to-noise ratio of the hDVS measurement.

However, the pump laser (from 302) is shown as a tunable (frequency-adjustable) source. By sweeping the frequency of the pump laser across a range covering all likely Brillouin frequencies, an increase in the Rayleigh backscatter detected at the balanced receiver is observed when the frequency-difference between the two pulses (probe and pump) match the local Brillouin frequency. This is therefore an alternative means of making a Brillouin measurement that is different from previously-known Brillouin measurements and combines some of the features of BOTDA and BOTDR. In particular, it is a truly signal-ended measurement, and yet it benefits from the amplification benefits of BOTDA. This allows the measurement to be made very fast.

Note also that, if in FIG. 3 310 AO2 is not active, i.e. a local oscillator signal is provided, but not probe pulse, then this arrangement is a variant of BOTDR, in that when the pump pulse is precisely separated from the local oscillator by a frequency that falls within the bandwidth of the receiver, a signal will be detected that is in fact the result of spontaneous Brillouin scattering from the pump pulse. This signal is also present when the probe pulse exists; it is weaker but detectable.

If the pump pulse is launched prior to the probe, then no interaction occurs between the Rayleigh backscatter from the probe and the pump pulse (because the Rayleigh backscatter is not present where/when the pump pulse passes through the fibre). However, in this case the spontaneous Brillouin scattering is still visible; it is quite faint relative to the Rayleigh backscatter (each of the Brillouin Stokes or anti-Stokes lines has an intensity about $1/60$ of the Rayleigh backscatter).

If the pump is as at a longer frequency than the probe, but separated by one Brillouin shift from it, it causes an attenuation of the Rayleigh backscatter, again through the stimulated Brillouin scattering process that in this case causes energy to be transferred from the backscatter to the pump.

Further embodiments of this arrangement include when both probe and pump pulse are present and the pump amplifies the Rayleigh backscatter. A gain of a factor of 5-6 has been observed. This effect can be used in several ways. Firstly, by scanning the frequency of one of the lasers relative to the other, the gain curve can be explored. Either laser can be scanned in frequency; it is the frequency-difference between the sources that determines whether or not Brillouin interaction takes place. However, the interpretation is simpler if the pump laser is scanned. The reason that is that the hDVS signal is subject to fading in its amplitude and its phase and if we scan the probe laser the effects of varying frequency will affect the fading as well as the presence or otherwise of a Brillouin interaction.

It should be realized that Brillouin gain or loss is accompanied by a frequency dependence of the phase of the amplified light; therefore the gain process should be visible in the amplified signal as a change in signal level as well as a change in the phase of the hDVS signal (which in fact is what the hDVS is designed to sense). The phase change also results in a delay or acceleration of the amplified (or attenuated) light, that is referred to in the literature as "slow light"; these effects have been studied in straightforward counter-propagating optical pump/probe beams for applications such as timing control in optical communication systems.

An embedded document has been added as an appendix that describes the theoretical aspects of this process and provides some calculations of the magnitudes to be expected; the appendix should be taken as an integral part of this patent memo. It also discusses other physical effects, that can be used in the context of the invention, in particular use of polarization, Kerr modulation, multiple Brillouin orders.

Experimental Verification

The arrangement 300 of FIG. 3 was assembled for an operating wavelength of about 1550 nm; the AOMs were obtained from Gooch & Housego (UK) and were fibre-coupled, 200 MHz shifting devices. The probe laser 308 was a fibre distributed feedback laser (Koheras, Denmark, model X-15, linewidth: a few hundred Hz) and the pump laser 302 was a semiconductor distributed feedback laser having a linewidth smaller than 1 MHz (the linewidth of the Brillouin process is of order 20 MHz at the operating wavelength so this linewidth is in no way limiting the measurement).

In this arrangement, the frequency of the pump laser 302 can be adjusted by minute changes of its current 1 mA results in a frequency shift of a few hundred MHz but only minor variations of the output power. This is the arrangement that was used and sweep rates of up 50 Hz (period of triangular wave) have been used

Operation as BOTDA

Figure 4:
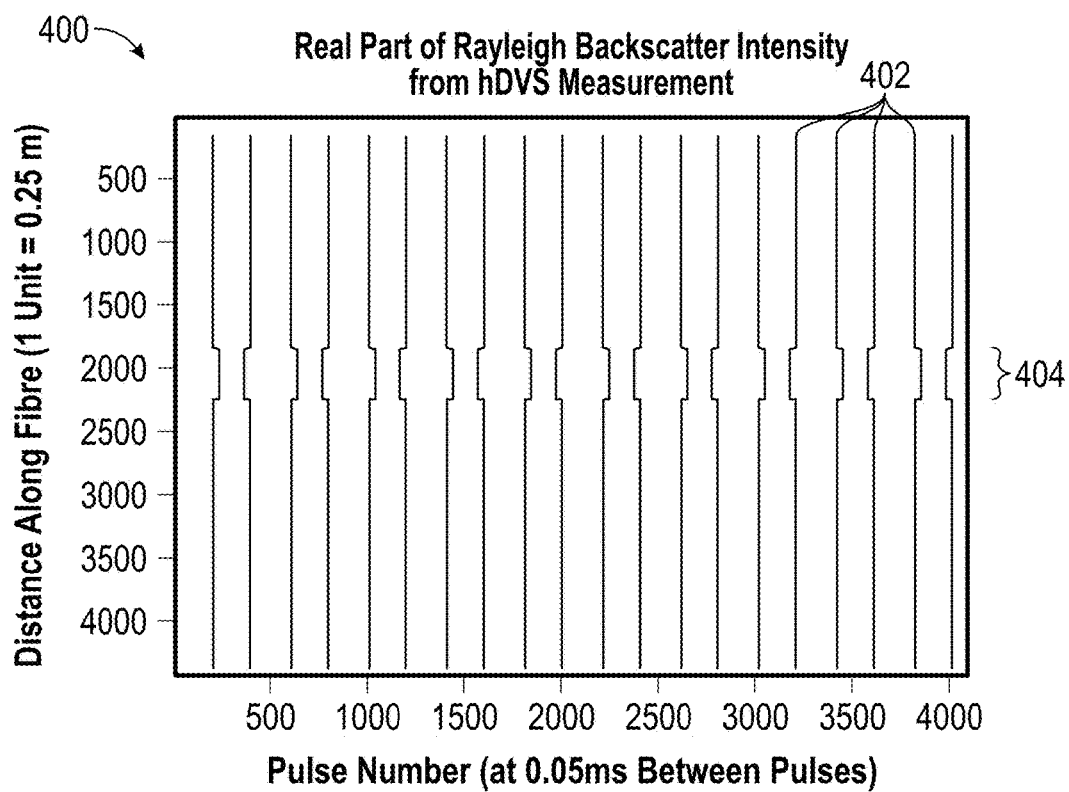
FIG. 4 illustrates a gray-scale plot of the intensity of the backscatter measured using the hDVS part of FIG. 3 when a pump pulse is present according to embodiments of the present disclosure.

FIG. 4 illustrates a gray-scale plot 400 of the intensity of the backscatter measured using the hDVS part of FIG. 3 when a pump pulse is present. The light vertical lines 402 show an increased backscatter intensity when the pump frequency matches that required to give rise to Brillouin gain. The dog-leg 404 in the curve between locations 1830 and 2190—a distance of about 90 m—is caused by the fact that the fibre here is of the LEAF type rather than METROCOR elsewhere.

Figure 5:
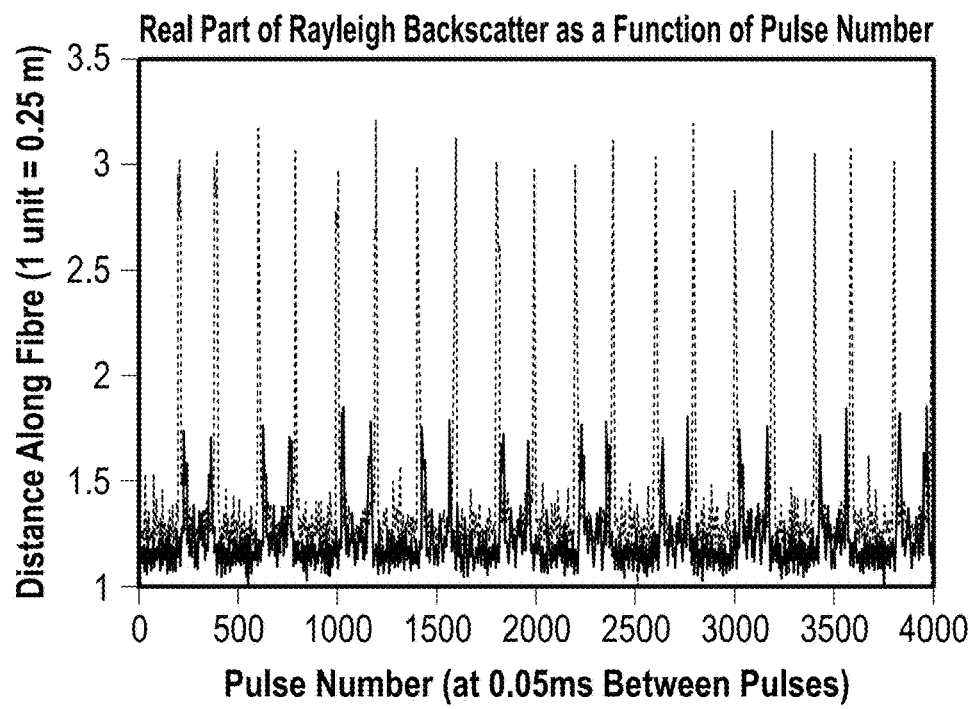
FIG. 5 shows a plot of the intensity (averaged over a 100 m section) in the METROCOR region (blue) and LEAF section (red) according to embodiments of the present disclosure.

FIG. 5 shows a plot of the intensity (averaged over a 100 m section) in the METROCOR region (blue) and LEAF section (red). In essence we are making a Brillouin frequency measurement from a single fibre end at a rate of 100 measurement/s. The triangular wave sweeps up and, then down in a 20 ms period, providing two measurements periods per 20 ms. The change of direction explains why the LEAF section occurs initially to one side, then the other of the Metrocor intensity plot.

Curves such as shown in FIG. 5 could be fitted to a function that is similar to the known Brillouin profile to determine the central frequency, i.e. the Brillouin shift. The Brillouin shift is itself a function of temperature and strain it is its value that, in measurements such as BOTDR, BOTDA and other Brillouin measurements is used as the variable that is captured and converted to the measurement of interest.

The plots of FIGS. 4 and 5 are essentially measures of the Brillouin gain. Note how the gain is different for LEAF and Metrocor; in fact LEAF is designed to have low non-linear effects and this includes Brillouin gain.

Figure 6A:
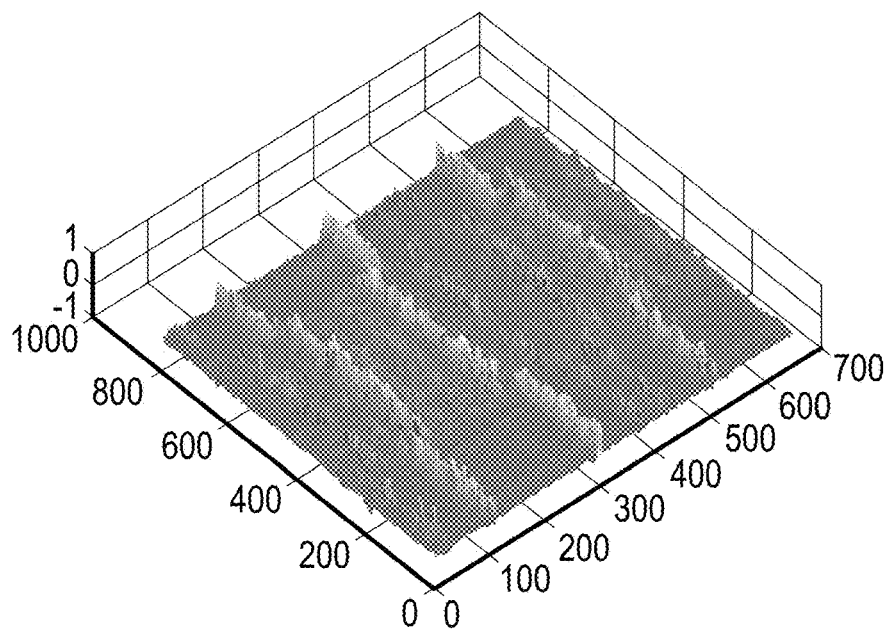
FIGS. 6a and 6b show surface plots of details of the transitions between Metrocor and LEAF: the shift in frequency is very clear and the transition happens over a distance of a few m consistent with the pulse durations used according to embodiments of the present disclosure.
Figure 6B:
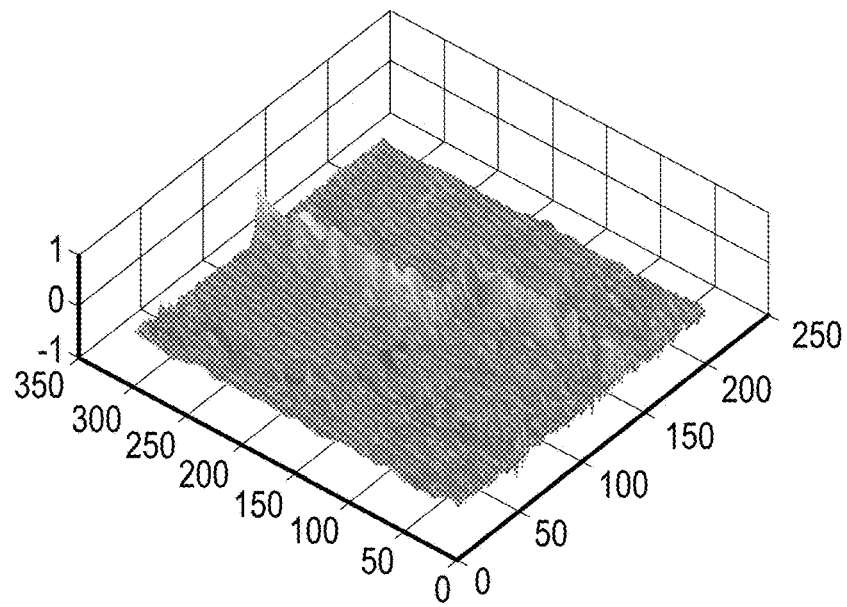

FIGS. 6a and 6b show surface plots of details of the transitions between Metrocor and LEAF: the shift in frequency is very clear and the transition happens over a distance of a few m consistent with the pulse durations used.

Figure 7:
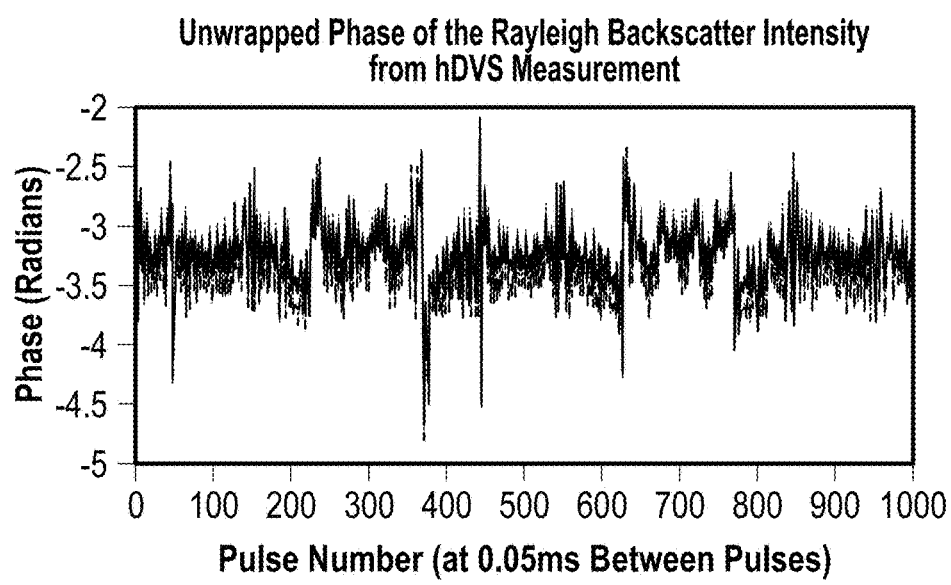
FIG. 7 shows a plot of the hDVS phase measurement according to embodiments of the present disclosure.

FIG. 7 shows a plot of the hDVS phase measurement.

Figure 8:
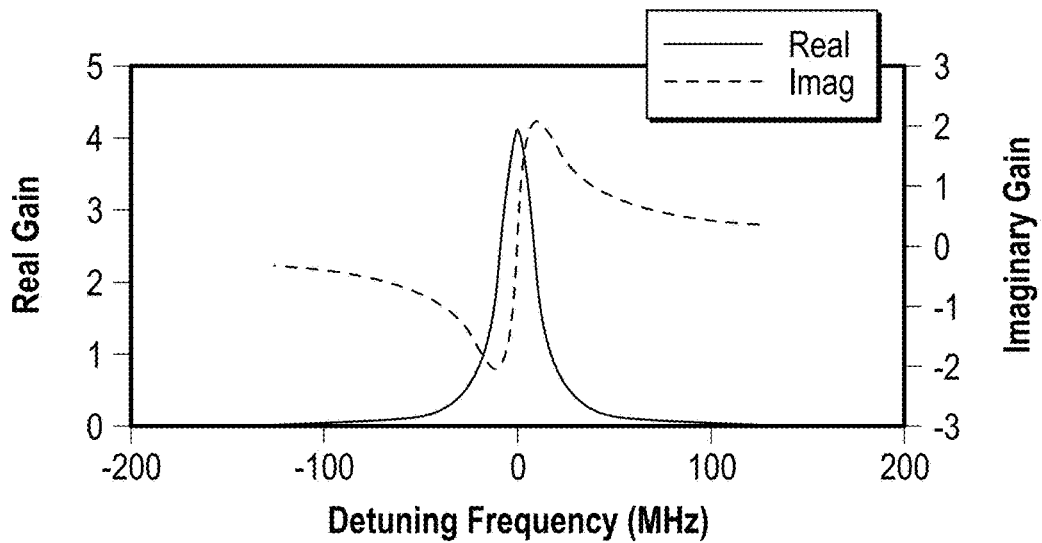
FIG. 8 is a plot of the phase unwrapped along the pulse number (i.e. frequency) axis is shown (the phase for several adjacent points along the fibre is shown). This frequency dependence is very similar to that predicted according to embodiments of the present disclosure.

FIG. 8 is a plot of the phase unwrapped along the pulse number (i.e. frequency) axis is shown (the phase for several adjacent points along the fibre is shown). This frequency dependence is very similar to that predicted.

Figure 9:
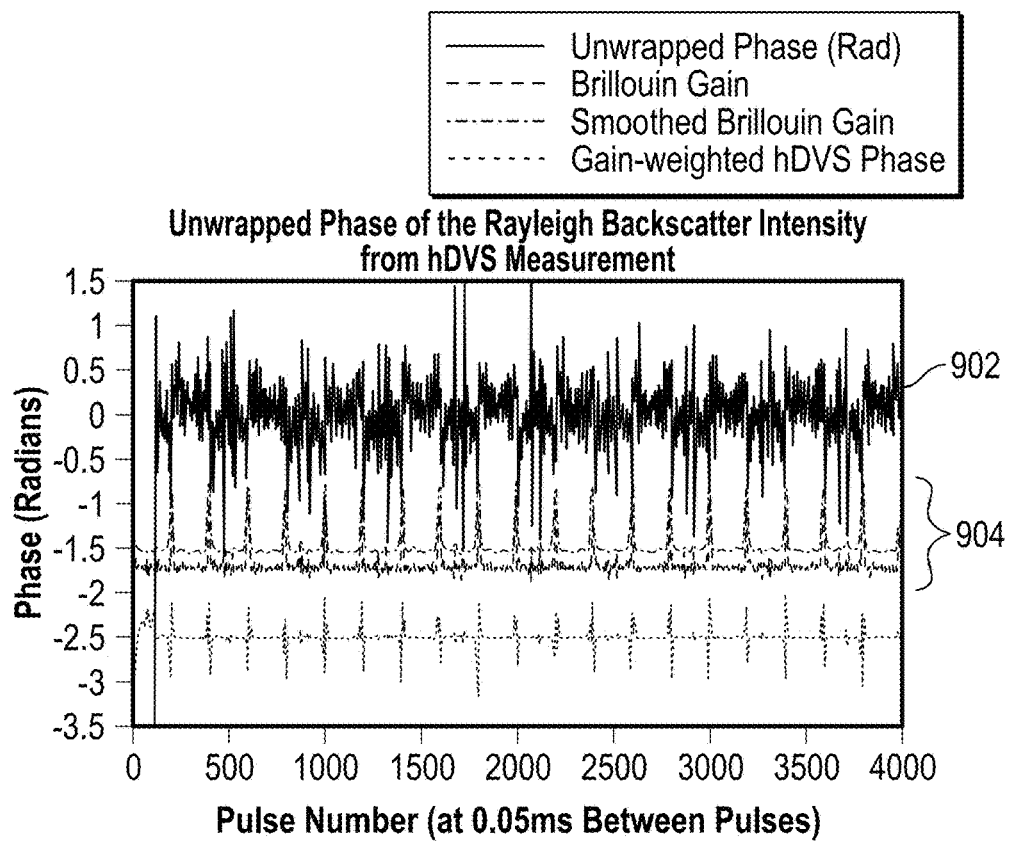
FIG. 9 shows a plot of the phase as calculated is quite noisy and where the spontaneous Brillouin appears, it also modifies the phase and adds noise according to embodiments of the present disclosure.

FIG. 9 shows a plot of the phase as calculated is quite noisy and where the spontaneous Brillouin appears, it also modifies the phase and adds noise. Consequently, in FIG. 9 some signal processing is applied. The raw phase 902 is shown as the blue curve. The gain 904 (black) and a smoothed version of the gain (red) are shown on the same plot, offset for clarity. Finally, the unwrapped phase, weighted by the smoothed gain is shown in the lowest curve—it is clear that this has considerably cleared up the phase measurement.

Figure 10:
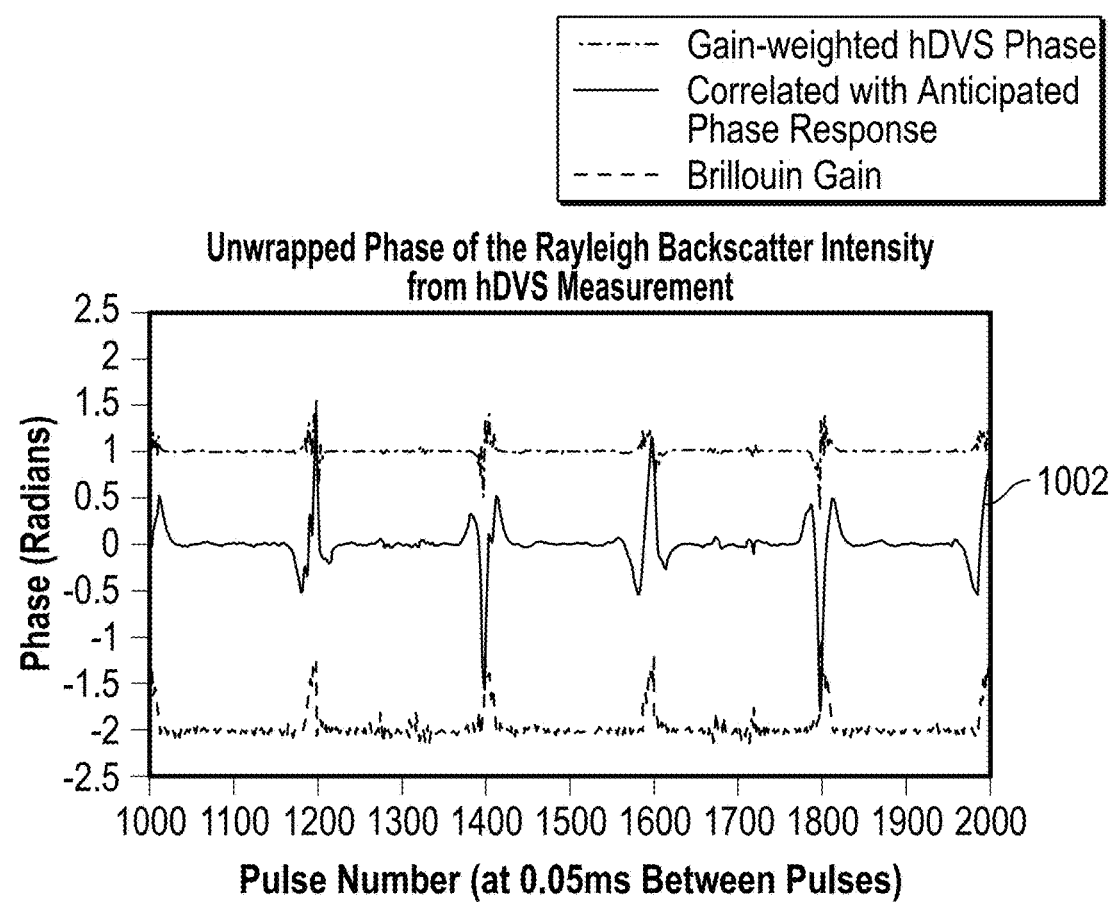
FIG. 10 shows a plot of the lowest curve of FIG. 9 correlated with a template based on the theoretical shape of the phase/frequency profile according to embodiments of the present disclosure.

FIG. 10 shows a plot of the lowest curve of FIG. 9 correlated with a template based on the theoretical shape of the phase/frequency profile. The results (black line) are shown in FIG. 10, together with the gain-weighted phase and the gain profile 1002. It is clear the correlated waveform provided a sharp indication of the centre of the gain curve.

Operation as BOTDR

The operation of the system when the probe pulse is not present or follows (rather than precedes) the pump is essentially that of BOTDR—the signals are usable, but far weaker than in the examples above where Brillouin gain is used. Curves have been obtained experimentally but have not been included for lack of time in this first iteration of the patent memorandum.

Remote Amplification

The gain provided to the Rayleigh backscatter can be employed as a means of amplifying the signal remotely, i.e. prior to returning to the instrument. Where the signal is weak (for example in high spatial resolution applications, the ability to boost the signal before it is attenuated by the losses in the return direction should provide an improvement in the signal-to-noise ratio of the measurement. In general, the Brillouin frequency is a function of distance along the fibre, either because the fibre is different (as illustrated here) or because the temperature and/or strain are different. The frequency of the pump can therefore be tailored to selectively amplify certain portions of the fibre (such as the far end) without causing the receiver to overload on the stronger signals (e g originating from the near end).

The ability to amplify selectively should allow the performance of an hDVS system to be improved in certain cases. In this case, it might be desirable to broaden the spectrum of the pump to make it less dependent on the precise Brillouin shift (and the details of the coherent Rayleigh backscatter). For example the pump could be modulated in frequency over a defined frequency band to encompass, say, a range of 50 MHz, which would cover a temperature range of about ±25 K.

POTDR/Faraday

The Brillouin interaction is sensitive to polarization: it is most effective when the states of polarization (SOP) of the counter-propagating waves are the same. If the pump and probe beam are launched into the same SOP, they may drift apart if the fibre is sufficiently birefringent, but in a typical conventional fibre that is nominally circularly symmetric this effect is expected to be small. However the backscattered light that interacts with the probe has to travel some distance in the reverse direction and so in the return leg of its travel between the point at which it was scattered and where it interacted with the pump, the birefringence affects only the backscatter; in addition, the short (but programmable) section of fibre between the pump and the probe is also not compensated by an equivalent birefringence applying to the pump.

The proposed method therefore offers a means of estimating the birefringence of a short section of fibre between the two pulses. An established means of measuring the polarization along the fibre, POTDR (polarization optical time-domain reflectometry) requires a numerical differentiation Although not yet tested experimentally, the methods described in this disclosure might allow the birefringence to be mapped along the sensing fibre more effectively than with POTDR. In the case of linear birefringence, one suitable configuration would be to control the relative SOP that the probe and pump are launched with and compare the response for different relative states, in particular one in which the two beams are launched with a 45° angle between them. Of course the linear SOP is not preserved and it would be necessary to recover the evolution of the SOP from the measured data.

One case is the measurement of axial magnetic fields through the Faraday effect: Faraday rotation is cumulative for forward and backward travelling light and so the effect of Faraday rotation on the final section (between probe and pump) is double the single-pass and specific to the location. With an alternating field, this might be measurable. It is a weak effect and unlikely to be suitable for magnetic location as used in the oilfield (e.g. for steering) but it could possibly be used where intense magnetic fields are generated.

More generally the relative state of polarization is determined by birefringence and this is sensitive to a number of physical parameters especially where the fibre is designed to enhance the effect. For example, side-hole fibres are a foundation of certain types of pressure sensor using fibres that exhibit pressure-dependent linear birefringence. The birefringence of certain fibres is also sensitive to temperature and strain.

Kerr Effect

The concept described in Dakin can be used in the context of the present disclosure, using cross-phase modulation by the pump of the backscatter signal that is detected as a phase shift by the hDVS part of the arrangement. In this case, the frequency of the pump and probe pulses are NOT related by a Brillouin shift. Although Dakin showed that the technique is disappointing as a temperature sensor in conventional fibres, the sensing of cross-phase modulation could still be useful in certain circumstances, such as in fibres especially designed with high Kerr coefficient, or to measure electric field. As in the case of Faraday rotation, the Kerr effect is quite weak in silica glasses (and so unlikely to be useful for measurements of small fields such as in resistivity measurements; however, the technique might still be useful with special fibres having high Kerr effects, or where stronger electric fields are present.

Limitations

The degree to which amplification can be achieved is limited by the non-linear effects that affect the pump: for example stimulated Raman (SRS) and Brillouin scattering (SBS), modulation instability and self-phase modulation (SPM). Which each of these effects becomes dominant (or the first limitation on the pump strength) depends on the linewidth of the pump and its duration. In our experiments, it seems that self-phase modulation is the first limitation that was found. It forced us to reduce the pump power when the fibre was long. Up to 7 km of SMF28e+ fibre was tested and it was found that at high pump powers the amplification only reached the initial portions of the fibre; as the pump power was reduced, although the gain near the launching near was reduced, the length over which the gain could be observed was extended. We interpret this as broadening of the spectrum of the pump. SPM can in principle be alleviated as taught in SLB docket 101.0025 (now GB 2469012B). This has not been tested in the present context.

SPM broadens the spectrum of the pump and once its linewidth exceeds the Brillouin natural linewidth, the Brillouin falls in proportion to the pump linewidth.

SPM is sensitive to the time-derivative of the pulse intensity. Therefore a pulse of reduced peak power but of duration extended such that the pump pulse energy is maintained is able to be propagated over longer distances while maintaining the gain. Doing so of course also degrades the spatial resolution of the arrangement, where it is used as a sensor.

In addition, eventually another limitation, of stimulated Brillouin scattering of the pump pulse itself causes a further limitation to the probe energy that can be launched.

Pulse Compression Coding

A number of pulse compression coding scheme are known in the field of BOTDA and they can be read across directly to the approach disclosed in this memorandum. In principle, they should allow the dilemma of spatial resolution vs. signal strength discussed in the previous section to be overcome. In addition, coding schemes that occur on a time scale faster than the phonon lifetime are known to permit extremely fine spatial resolution. These techniques are in principle also applicable to the present disclosure.

Dealing with Fading

Fading is intrinsic to the narrow band nature of the probe pulse: the Rayleigh scattering that proves the return from the probe is caused by fixed inhomogeneities in the glass through which the probe is travelling. These cause re-radiation of a small electric field that, for each scatterer has a fixed phase relationship to the probe wave. The signal as seen at the detector is the electric field summation of the contributions of all of the scatterers within the region of fibre occupied by the probe pulse at a location corresponding to time at which the data is captured (i.e. the location is dictated by the round-trip transit time of the pulse to the location and of the backscatter from that location to return). The electric field summation depends on the relative phase of the elemental scattered fields and in some locations, for some probe frequency this will sum to near zero—this is a fade.

In US2013/0113629A1, a technique that involves launching multiple probe pulses at different frequencies is disclosed; fading is a statistical phenomenon and with a sufficient number of probe frequencies, there is a reasonable chance of at least one of these probe frequencies returning a usable signal from each location. This approach can also be applied to the basic technique disclosed in the present disclosure.

Alternatively, the frequency of the probe laser can be varied at a different rate from that of the pump laser. For example, if after each sweep of the pump laser, the probe laser were varied in its frequency by an amount sufficient to result in a statistically independent fading pattern (the change in frequency required is at least the inverse of the probe pulse duration), and the sweep of the pump pulse frequency is then repeated, the interactions will occur with a new fading pattern. Of course, the frequency difference between pump and probe must be maintained (by also shifting the start of the pump sweep) or taken into account (shifting the frequency scale used in the signal processing). In any event, the fading can be overcome.

Tying the Frequency of the Probe to that of the Pump.

The setup of FIG. 3 shows two independent lasers. In practice, it is important to know their frequency separation. This can be achieved by deriving one source from the other.

For example the pump input wave can be derived from the probe by taking a second tap from the probe laser by applying a frequency-translation of order the Brillouin shift (plus of course the time-varying element for a sweep). This can be achieved, for example using a single-sideband modulator, such as provided by IQ modulators driven appropriately.

In some cases, it may be sufficient to measure the frequency-difference between the lasers. This can be arranged by taking a tap from each of the lasers and mixing their outputs onto a receiver or preferably a balanced receiver. This is shown in the arrangement below where for both lasers, a 2% fraction of the power is tapped prior to passing the remainder to the previously-described arrangement. The receiver within the frequency calibration unit generates a beat frequency that can be counted electronically to provide an estimate of the frequency-difference between them. It is anticipated that the counter would be re-set and restarted at the launching of each probe pulse and that the output of the counter would be read prior to the resetting and starting. Assuming a difference-frequency of 10 GHz, and a prescaler that divides this beat signal by a factor of 8, a pulse repetition frequency of 10 kHz would allow the frequency-difference to be resolved to better than 100 kHz, which is ample for the present application. If necessary, lower pre-scaling factors could be employed provided that the counter is sufficiently fast.

Figure 11:
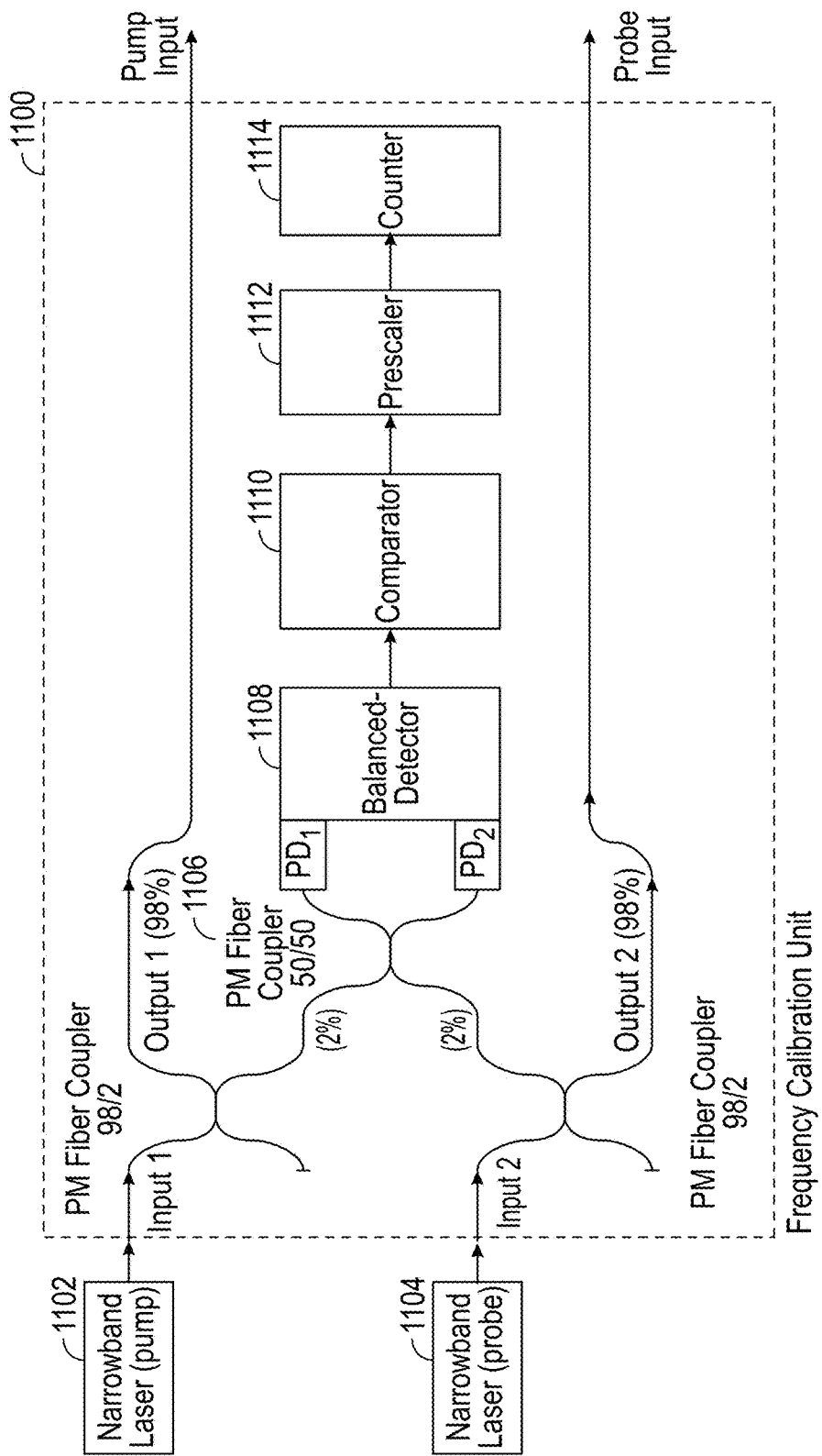
FIG. 11 illustrates yet another embodiment including a pump laser 1102 and a probe laser 1104, and a PM fiber coupler 1106, a balanced detector 1108, a comparator 1110, a prescaler 1112, and a counter according to embodiments of the present disclosure.

FIG. 11 illustrates yet another embodiment including a pump laser 1102 and a probe laser 1104, and a PM fiber coupler 1106, a balanced detector 1108, a comparator 1110, a prescaler 1112, and a counter 1114. In this embodiment the probe laser is sufficiently an additional laser, the frequency of which is adjusted to be close to that of the laser that is modulated (usually the pump) can be used to mix with the pump. This could simplify the electronics.

Figure 12:
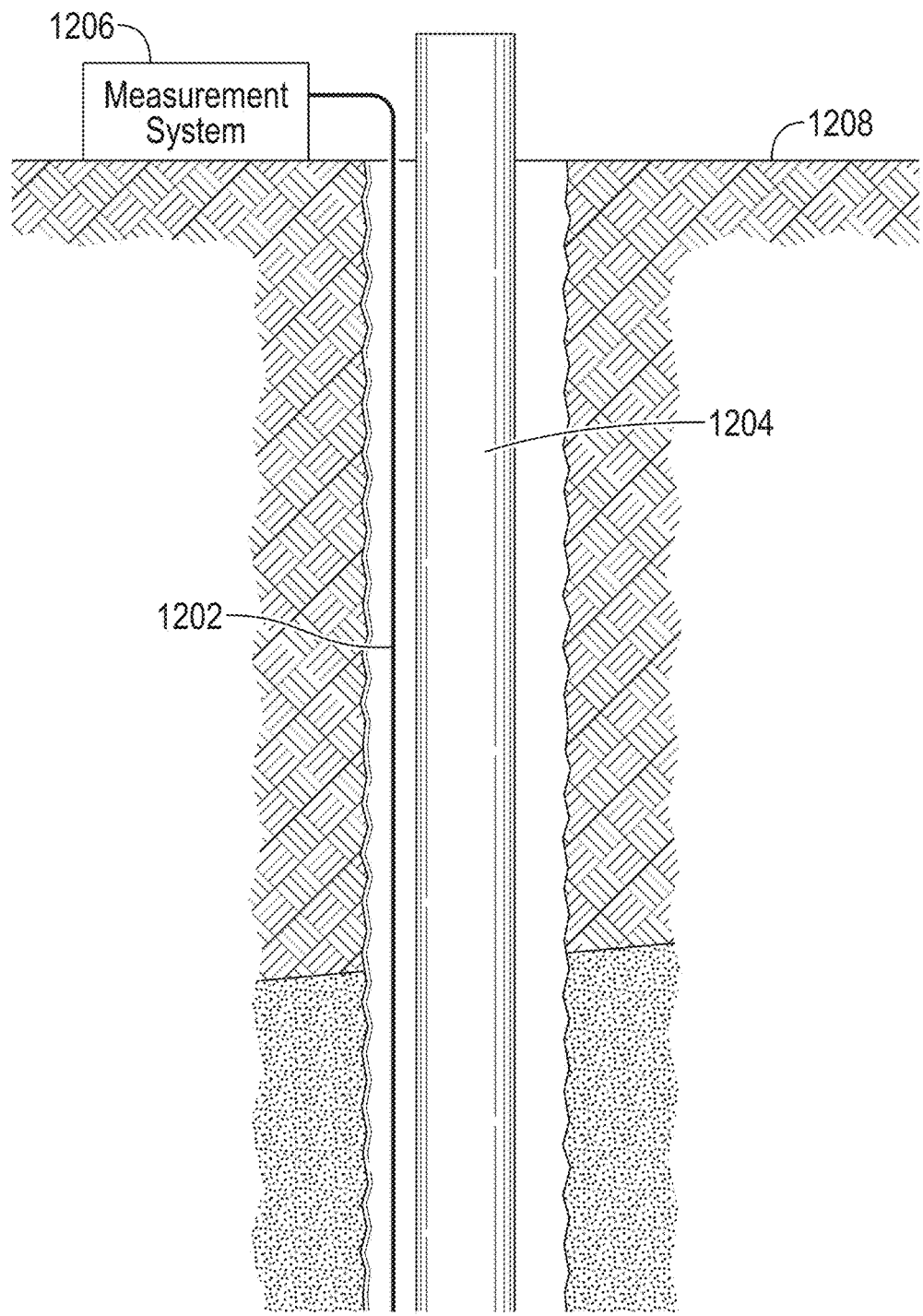
FIG. 12 schematically illustrates use of a measuring arrangement, such as the arrangement of either FIG. 3 or FIG. 11, in a downhole application according to an embodiment.

As shown schematically in FIG. 12, an optical fiber 1202, such as the sensing fiber shown schematically in FIG. 3, can be deployed proximate a structure 1204 that is positioned in a wellbore 1208 for use in a downhole installation. The structure 1204 can be a downhole tool or other downhole structure such as a tool string or tubing. A measurement system 1206, which includes the interrogation and measurement components for an OTDR system (e.g., laser sources 302, 308, modulators 304, 310, amplifiers 306, 312, balanced receiver 314 and other components shown in the arrangement 300 in FIG. 3; laser sources 1102, 1104 and frequency calibration unit 1100 shown in FIG. 11), is located proximate a first end of the fiber 1202 which is toward or at a surface 1210. The system 1206 is coupled to the fiber 1202 to transmit the laser signals and detect returned backscatter signals to determine the characteristics of interest of the structure 1204 (e.g., strain, vibration, temperature) in the manners described above.

The invention claimed is:

1. A system for measuring vibration in a structure, comprising:
   an optical fiber proximate to the structure having a first end and a second end, wherein a characteristic of the structure causes a backscatter through the optical fiber in response to light being emitted into the optical fiber;
   a measurement component configured to measure the vibration in the structure as related to the backscatter in the optical fiber, wherein the measurement component is positioned proximate the first end of the optical fiber;
   a first laser source configured to emit a first laser into the optical fiber proximate the first end of the optical fiber, the first laser having a first frequency; and
   a second laser source configured to emit a second laser into the optical fiber proximate the first end of the optical fiber, the second laser having a second frequency, wherein a difference between the first frequency and the second frequency is delta-f, wherein delta-f causes an attenuation of a Rayleigh backscatter through a stimulated Brillouin scattering process that causes energy to be transferred from the backscatter to the first laser or the second laser.

2. The system of claim 1, further comprising one or more acousto-optical modulators on the optical fiber.

3. The system of claim 1, further comprising one or more fiber amplifiers on the optical fiber.

4. The system of claim 3 wherein the fiber amplifiers are erbium doped fiber amplifiers.

5. The system of claim 1 wherein delta-f is less than a Brillouin shift.

6. The system of claim 5 wherein the first laser interacts with the Rayleigh backscatter generated by the second laser.

7. The system of claim 1 wherein the first laser amplifies the Rayleigh backscatter.

8. The system of claim 7 wherein a gain of at least 5 is achieved.

9. The system of claim 1 wherein the first end of the optical fiber is positioned near a surface of a downhole installation and the second end of the optical fiber is positioned downhole of the first end.

10. The system of claim 1 wherein the characteristic of the structure is at least one of temperature, strain, and vibration.

11. A method of detecting vibration in a structure, the method including:
   positioning an optical fiber proximate to the structure such that displacement of the structure affects reflective properties of the optical fiber;
   emitting a probe laser into the optical fiber at a first end of the optical fiber;
   emitting a pump laser into the optical fiber at the first end, wherein the pump laser and the probe laser have different frequencies separated by a delta-f frequency, and wherein the pump laser is configured to interact with the probe laser to improve a backscatter signal through the optical fiber, wherein the delta-f frequency causes an attenuation of a Rayleigh backscatter through a stimulated Brillouin scattering process that causes energy to be transferred from the backscatter signal to the probe laser or the pump laser.

12. The method of claim 11, further comprising amplifying one or more of the probe and pump lasers using an erbium doped fiber amplifier.

13. The method of claim 11, wherein the first end of the optical fiber is toward a surface of a downhole tool, and wherein the second end is further downhole than the first end.

* * * * *